United States Patent
Shintani

(10) Patent No.: US 9,860,419 B2
(45) Date of Patent: Jan. 2, 2018

(54) IMAGE READING DEVICE, IMAGE FORMING APPARATUS, AND IMAGE READING METHOD

(71) Applicant: KYOCERA Document Solutions Inc., Osaka-shi, Osaka (JP)

(72) Inventor: Kazushi Shintani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/084,393

(22) Filed: Mar. 29, 2016

(65) Prior Publication Data

US 2016/0295069 A1 Oct. 6, 2016

(30) Foreign Application Priority Data

Mar. 30, 2015 (JP) ................. 2015-068931

(51) Int. Cl.
H04N 1/04 (2006.01)
H04N 1/387 (2006.01)
H04N 1/00 (2006.01)

(52) U.S. Cl.
CPC ....... H04N 1/3876 (2013.01); H04N 1/00708 (2013.01); H04N 1/00748 (2013.01); H04N 1/3873 (2013.01); H04N 2201/0081 (2013.01); H04N 2201/0094 (2013.01)

(58) Field of Classification Search
CPC ............. H04N 1/3876; H04N 1/00708; H04N 1/00748; H04N 1/3873; H04N 2201/0081; H04N 2201/0094
See application file for complete search history.

(56) References Cited

U.S. PATENT DOCUMENTS

| 4,811,047 A | * | 3/1989 | Hosaka | ................. | G03G 15/04 399/14 |
| 5,528,387 A | * | 6/1996 | Kelly | .................. | G06K 9/3275 358/486 |
| 6,480,668 B1 | | 11/2002 | Yasui | | |
| 8,649,052 B2 | * | 2/2014 | Hoover | ..................... | B41J 3/60 358/1.13 |
| 9,241,084 B2 | * | 1/2016 | Isaev | .................. | H04N 1/00018 |
| 9,319,547 B2 | * | 4/2016 | Isaev | .................. | H04N 1/00018 |

FOREIGN PATENT DOCUMENTS

| JP | 2003051935 A | 2/2003 |
| JP | 2010093732 A | 4/2010 |
| JP | 2012068358 A | 4/2012 |

* cited by examiner

*Primary Examiner* — Cheukfan Lee
(74) *Attorney, Agent, or Firm* — Alleman Hall Creasman & Tuttle LLP

(57) ABSTRACT

An image reading device includes an image reading portion, a detection processing portion, and a combination processing portion. The image reading portion is configured to read image data of a document placed on a document placement surface. The detection processing portion is configured to detect a corner portion of the document on the basis of the image data read by the image reading portion. The combination processing portion is configured to combine the respective image data read by the image reading portion until a total number of the corner portions of the document detected by the detection processing portion becomes a predetermined value.

10 Claims, 5 Drawing Sheets

IMAGE READING DEVICE, IMAGE FORMING APPARATUS, AND IMAGE READING METHOD

INCORPORATION BY REFERENCE

This application is based upon and claims the benefit of priority from the corresponding Japanese Patent Application No. 2015-068931 filed on Mar. 30, 2015, the entire contents of which are incorporated herein by reference.

BACKGROUND

The present disclosure relates to an image reading device, an image forming apparatus, and an image reading method.

In an image reading device such as a scanner, image data of a document placed on a document placement surface is read. Meanwhile, an image reading device capable of reading image data of a document having a size exceeding the size of a document placement surface is known. For example, in this type of image reading device, image data of respective sections of the document are read separately at multiple times. Then, the read multiple image data are combined to produce image data of the entirety of the document.

SUMMARY

An image reading device according to one aspect of the present disclosure includes an image reading portion, a detection processing portion, and a combination processing portion. The image reading portion is configured to read image data of a document placed on a document placement surface. The detection processing portion is configured to detect a corner portion of the document on the basis of the image data read by the image reading portion. The combination processing portion is configured to combine the respective image data read by the image reading portion until a total number of the corner portions of the document detected by the detection processing portion becomes a predetermined value.

An image forming apparatus according to another aspect of the present disclosure includes an image reading device and an image forming portion. The image reading device includes an image reading portion, a detection processing portion, and a combination processing portion. The image reading portion is configured to read image data of a document placed on a document placement surface. The detection processing portion is configured to detect a corner portion of the document on the basis of the image data read by the image reading portion. The combination processing portion is configured to combine the respective image data read by the image reading portion until a total number of the corner portions of the document detected by the detection processing portion becomes a predetermined value. Meanwhile, the image forming portion is capable of forming an image on the basis of image data.

An image reading method according to still another aspect of the present disclosure includes: a first step of reading image data of a document placed on a document placement surface; a second step of detecting a corner portion of the document on the basis of the read image data; and a third step of combining the respective image data read in the first step until a total number of the detected corner portions of the document becomes a predetermined value.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings in order to allow understanding of the present disclosure. It should be noted that the following embodiment is an example embodying the present disclosure and does not limit the technical scope of the present disclosure.

[Schematic Configuration of Image Forming Apparatus 10]

Figure 1:
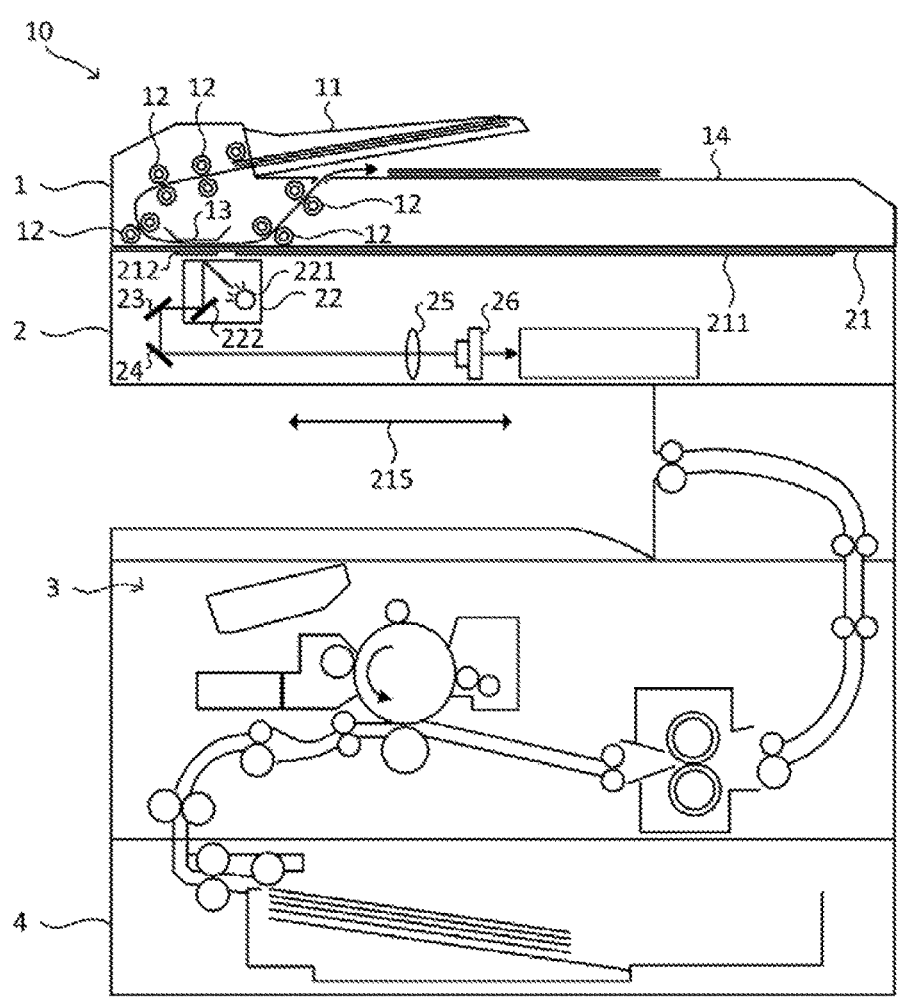
FIG. 1 is a diagram showing the configuration of an image forming apparatus according to an embodiment of the present disclosure.

First, a schematic configuration of an image forming apparatus 10 according to an embodiment of the present disclosure will be described with reference to FIGS. 1 to 3. Here, FIG. 1 is a schematic cross-sectional view showing the configuration of the image forming apparatus 10. FIG. 3 is a schematic plan view showing the configuration of a document table 21 of an image reading portion 2.

Figure 2:
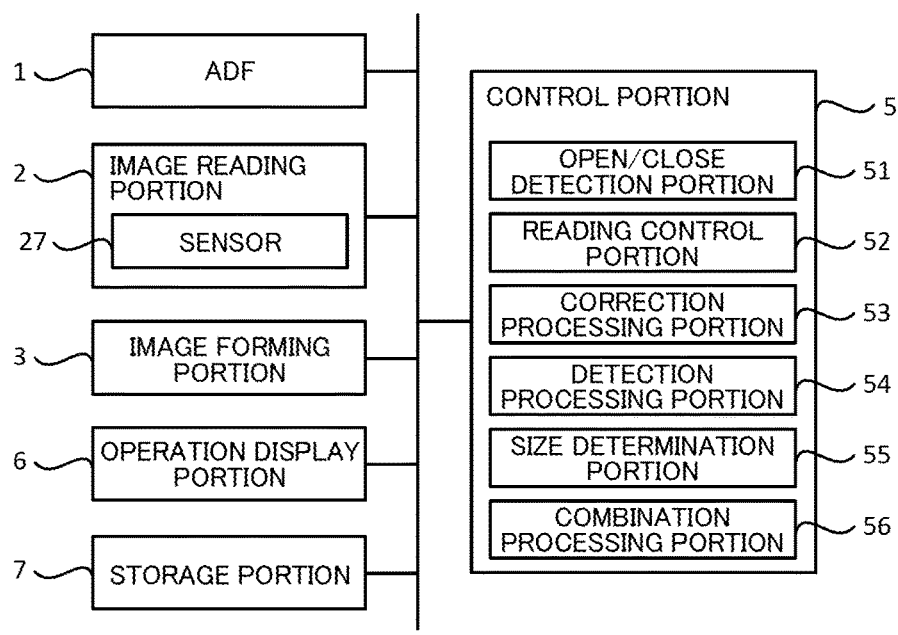
FIG. 2 is a block diagram showing the system configuration of the image forming apparatus according to the embodiment of the present disclosure.
Figure 3:
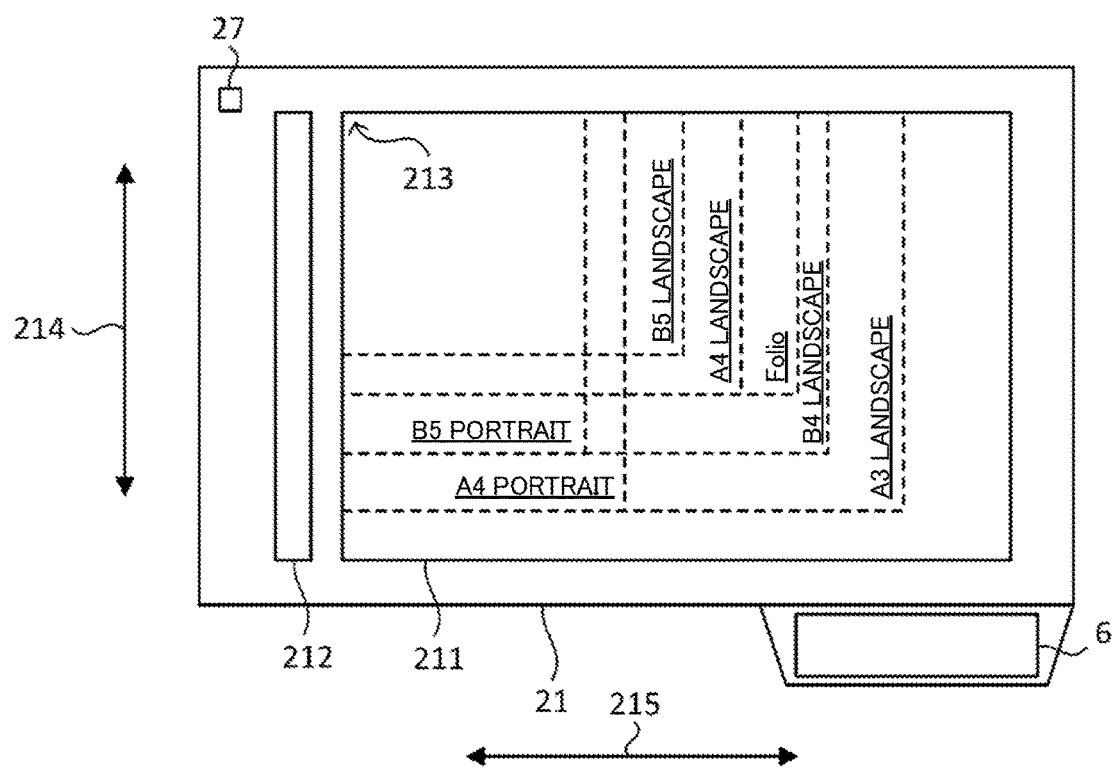
FIG. 3 is a diagram showing the configuration of a document table of the image forming apparatus according to the embodiment of the present disclosure.

As shown in FIGS. 1 and 2, the image forming apparatus 10 includes an ADF 1, the image reading portion 2, an image forming portion 3, a sheet feed portion 4, a control portion 5, an operation display portion 6, and a storage portion 7. The image forming apparatus 10 is a multifunction peripheral having a plurality of functions such as a scanning function to read image data from a document and a printing function to form an image on the basis of image data as well as a facsimile function, a copy function, or the like. Here, a device including the image reading portion 2 and the control portion 5 is an example of an image reading device in the present disclosure. The present disclosure is applicable to an image reading device or an image forming apparatus such as a scanner apparatus, a facsimile apparatus, and a copy machine.

The image forming portion 3 is able to form an image by electrophotography on the basis of image data read by the image reading portion 2 or image data inputted from an information processing apparatus such as an external personal computer. Specifically, the image forming portion 3 includes a photosensitive drum, a charging device, a laser scanning unit (LSU), a developing device, a transfer roller, a cleaning device, a fixing roller, a pressure roller, and a sheet discharge tray. In the image forming portion 3, an image is formed on a sheet fed from the sheet feed portion 4, and the sheet on which the image has been formed is discharged to the sheet discharge tray.

The control portion 5 includes control devices such as a CPU, a ROM, and a RAM that are not shown. The CPU is a processor that performs various calculation processes. The ROM is a non-volatile storage portion in which information such as a control program for causing the CPU to perform various processes is stored in advance. The RAM is a volatile storage portion used as a temporary storage memory (working area) for various processes performed by the CPU. In the control portion 5, various control programs stored in advance in the ROM are executed by the CPU. Accordingly, the image forming apparatus 10 is controlled centrally by the control portion 5. The control portion 5 may be composed of an electronic circuit such as an integrated circuit (ASIC), or may be a control portion provided independently of a main control portion that centrally controls the image forming apparatus 10.

The operation display portion 6 includes: a display portion, such as a liquid crystal display, which displays various kinds of information in accordance with control instructions from the control portion 5; and an operation portion, such as an operation key or a touch panel, which inputs various kinds of information to the control portion 5 in accordance with operations of a user.

The storage portion 7 is a storage device such as a solid-state drive (SSD) or a hard disk drive (HDD). Instead of the storage portion 7, a non-volatile memory such as an EEPROM (registered trademark) may be provided in the control portion 5.

As shown in FIG. 1, the ADF 1 is an automatic document feeder that includes a document set portion 11, a plurality of conveying rollers 12, a document holder 13, and a sheet discharge portion 14. In addition, the ADF 1 is supported so as to be able to open/close relative to a document placement surface 211 of the image reading portion 2, and thus also serves as a document cover for a document placed on the document placement surface 211. In the ADF 1, when each conveying roller 12 is driven by a motor that is not shown, a document placed on the document set portion 11 is conveyed to the sheet discharge portion 14 through a reading position at which image data is read by the image reading portion 2. Accordingly, the image reading portion 2 is able to read image data from the document conveyed by the ADF 1. Here, the ADF 1 is an example of a cover member in the present disclosure.

The image reading portion 2 is an image reading portion capable of reading image data from a document. Specifically, as shown in FIGS. 1 to 3, the image reading portion 2 includes the document table 21, a reading unit 22, a mirror 23, a mirror 24, an optical lens 25, a charge coupled device (CCD) 26, and a sensor 27.

The document table 21 is provided at the upper surface of the image reading portion 2, and includes the document placement surface 211 and a conveyance reading surface 212 as shown in FIGS. 1 and 3. The document placement surface 211 is a light-transmitting contact glass on which a document that is an image data reading target is placed. On the document placement surface 211, documents of various sizes are placed so as to be aligned with a predetermined placement reference position 213. For example, on the document placement surface 211, documents of sizes such as B5 portrait, A4 portrait, B5 landscape, A4 landscape, Folio, B4 landscape, and A3 landscape can be placed. The conveyance reading surface 212 is a conveyance reading glass that allows light, which is emitted from the reading unit 22 toward a document conveyed by the ADF 1, to pass therethrough.

The reading unit 22 includes a light source 221 and a mirror 222, and is configured to be movable in a sub-scanning direction 215 shown in FIG. 1 by a movement mechanism that uses a driving means such as a stepping motor and is not shown. When the reading unit 22 is moved in the sub-scanning direction 215 by the driving means, scanning in the sub-scanning direction 215 is performed with the light emitted from the light source 221 onto the document table 21.

The light source 221 includes a large number of white LEDs arranged along a main-scanning direction 214 shown in FIG. 3. The light source 221 emits one line of white light in the main-scanning direction 214 through the document placement surface 211 or the conveyance reading surface 212 of the document table 21 to a document. The position to which the light is emitted by the light source 221 is a reading position at which image data is read by the image reading portion 2. The reading position moves in the sub-scanning direction 215 along with movement of the reading unit 22 in the sub-scanning direction 215. Specifically, when reading image data from a document placed on the document placement surface 211, the reading unit 22 is moved to a position at which the light from the light source 221 passes through the document placement surface 211. In addition, when reading image data from a document conveyed by the ADF 1, the reading unit 22 is moved to a position at which the light from the light source 221 passes through the conveyance reading surface 212.

The mirror 222 reflects, toward the mirror 23, the light that has been emitted from the light source 221 and reflected by the surface of a document present at the reading position on the document table 21. Then, the light reflected by the mirror 222 is guided by the mirror 23 and the mirror 24 to the optical lens 25. The optical lens 25 converges the light incident thereon from the mirror 24 and causes the converged light to enter the CCD 26.

The CCD 26 is an image sensor that includes a photoelectric conversion element that converts the received light to an electric signal (voltage) corresponding to the amount of the light and outputs the electric signal as image data. The CCD 26 inputs an electric signal based on the light that is reflected from a document and incident on the CCD 26 when light is emitted from the light source 221, as image data of the document to the control portion 5.

As shown in FIG. 3, the sensor 27 is provided on the document table 21 and detects an open/closed state of the ADF 1 relative to the document table 21. For example, the sensor 27 is a mechanical switch. Specifically, the sensor 27 outputs, to the control portion 5, an electric signal corresponding to each of an open state and a closed state of the ADF 1. The sensor 27 may be a reflection type optical sensor.

Meanwhile, an image reading device capable of reading image data of a document having a size exceeding the size of a document placement surface is known. For example, in this type of image reading device, image data of respective sections of the document are read separately at multiple times. Then, the read multiple image data are combined to produce image data of the entirety of the document.

Here, when image data of a document having a size exceeding the size of the document placement surface is read in the image reading device, at least the user needs to perform an operation for setting the size of the document or a number of times of reading. On the other hand, with the image forming apparatus 10 according to the embodiment of the present disclosure, as described below, it is possible to reduce the time and effort for an operation for setting the size of a document to be read or a number of times of reading.

Specifically, an image combination program for causing the CPU to perform a later-described image combination process (see a flowchart in FIG. 4) is stored in advance in the ROM of the control portion 5. The image combination program may be stored in a non-transitory computer-readable storage medium such as a CD, a DVD, or a flash memory, and may be read from the storage medium and installed into the storage portion 7.

As shown in FIG. 2, the control portion 5 includes an open/close detection portion 51, a reading control portion 52, a correction processing portion 53, a detection processing portion 54, a size determination portion 55, and a combination processing portion 56. Specifically, the control portion 5 functions as the open/close detection portion 51, the reading control portion 52, the correction processing portion 53, the detection processing portion 54, the size determination portion 55, and the combination processing portion 56 by executing, with the CPU, the image combination program stored in the ROM.

The open/close detection portion 51 detects the open/closed state of the ADF 1. Specifically, on the basis of the electric signal outputted from the sensor 27, the open/close detection portion 51 determines whether the ADF 1 is in an state where the ADF 1 is opened relative to the document placement surface 211 of the document table 21 or in a state where the ADF 1 is closed relative to the document placement surface 211 of the document table 21.

When the open/close detection portion 51 detects switching from the state where the ADF 1 is opened (open state) to the state where the ADF 1 is closed (closed state), the reading control portion 52 starts reading of image data by the image reading portion 2. Specifically, the reading control portion 52 causes the image reading portion 2 to start an image reading process of reading image data of a document placed on the document placement surface 211.

The correction processing portion 53 corrects tilt of each image data read by the image reading portion 2. For example, the correction processing portion 53 detects boundary lines between the document placement surface 211 and the document on the basis of the density of each pixel included in the image data. Then, the correction processing portion 53 corrects tilt of an image of the document included in the image data such that tilt of each detected boundary line in the image data is parallel to the main-scanning direction 214 or the sub-scanning direction 215 in the image data.

The detection processing portion 54 detects a corner portion of the document on the basis of the image data read by the image reading portion 2. Specifically, the detection processing portion 54 detects a corner portion formed by the boundary lines detected by the correction processing portion 53, as a corner portion of the document.

The size determination portion 55 determines the size of the document in accordance with the number of the image data read by the image reading portion 2 until the total number of the corner portions of the document detected by the detection processing portion 54 becomes four. For example, if the number of the image data read by the image reading portion 2 is two, the size determination portion 55 determines that the size of the document is A2 portrait. In addition, if the number of the image data read by the image reading portion 2 is four, the size determination portion 55 determines that the size of the document is A1 landscape.

The combination processing portion 56 combines the respective image data read by the image reading portion 2 until the total number of the corner portions of the document detected by the detection processing portion 54 becomes a predetermined set value. Specifically, the combination processing portion 56 combines the respective image data read by the image reading portion 2 until the total number of the corner portions of the document detected by the detection processing portion 54 becomes four. In addition, the combination processing portion 56 combines the respective image data on which the correction process by the correction processing portion 53 has been performed. The set value is set as appropriate in accordance with a user operation on the operation display portion 6, for example, in initial setting of the image forming apparatus 10. However, the set value may be optionally changeable per image reading process, for example, in the cases of reading images of documents having polygonal shapes other than a quadrangular shape in the image reading portion 2. Here, the set value is an example of a predetermined value in the present disclosure.

For example, on the basis of the size of the document determined by the size determination portion 55 and the positions of the corner portions of the document included in the respective image data detected by the detection processing portion 54, the combination processing portion 56 combines the respective image data. Specifically, on the basis of the positions of the corner portions of the document included in a plurality of the respective image data, the combination processing portion 56 combines the respective image data by superposing the images of the document included in the plurality of the respective image data so as to match the size determined by the size determination portion 55. In addition, the combination processing portion 56 performs a rotation process of rotating the image data by 180 degrees as necessary, and combines the respective image data.

The combination processing portion 56 may combine the respective image data on the basis of an overlap region of the images detected from the respective image data read by the image reading portion 2.

In addition, when the combination processing portion 56 combines the respective image data on the basis of the overlap region of the images, if the image data that is not included in the overlap region of the images is present, the combination processing portion 56 may issue a notification indicating that it is impossible to combine the respective image data. For example, the combination processing portion 56 issues a notification by displaying, on the operation display portion 6, a message indicating that it is impossible to combine the respective image data.

[Image Combination Process]

Figure 4:
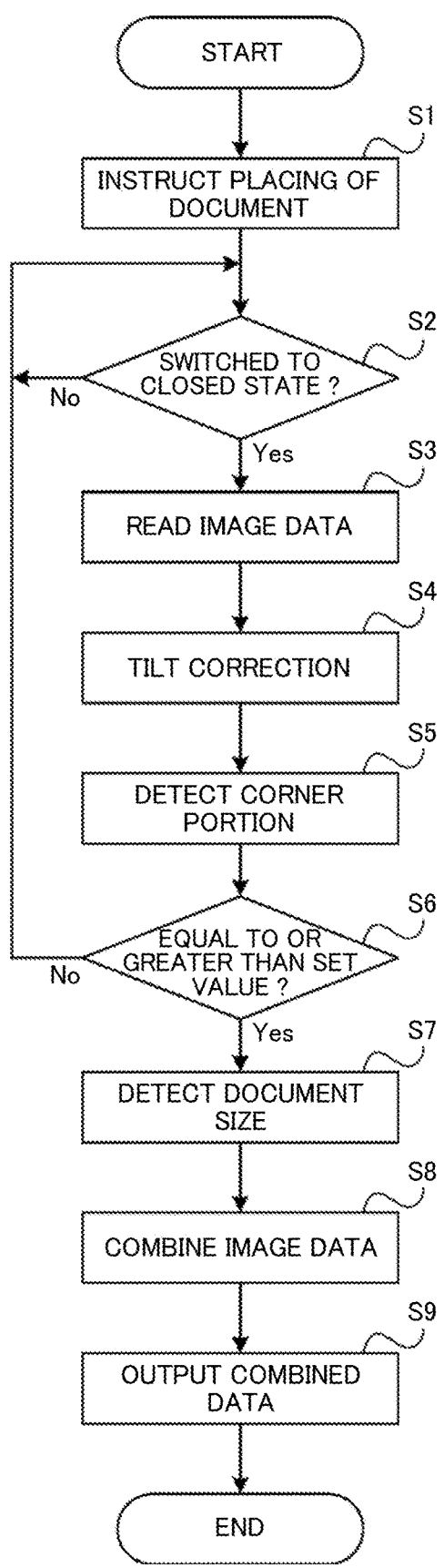
FIG. 4 is a flowchart showing an example of an image combination process performed by the image forming apparatus according to the embodiment of the present disclosure.

Hereinafter, an example of a procedure of the image combination process performed by the control portion 5 in the image forming apparatus 10 will be described with reference to FIG. 4. Here, S1, S2 . . . represent numbers of process procedures (steps) executed by the control portion 5. The control portion 5 performs the image combination process when execution of the image reading process using the document table 21 is instructed by a user operation on the operation display portion 6 in a state where an image combination function embodied by the image combination process is set to be enabled. If the image combination function is set to be disabled, the control portion 5 does not perform the image combination process even in the case of performing the image reading process using the document table 21.

<Step S1>

First, in step S1, the control portion 5 displays, on the operation display portion 6, a message for instructing the user to place a document on the document placement surface 211 and to close the ADF 1.

<Step S2>

In step S2, the control portion 5 determines whether the ADF 1 has been switched from the open state to the closed state. Specifically, the control portion 5 detects presence/absence of switching of the ADF 1 from the open state to the closed state on the basis of the electric signal outputted from the sensor 27. Here, the process in step S2 is performed by the open/close detection portion 51 of the control portion 5.

Here, if the control portion 5 determines that the ADF 1 has been switched from the open state to the closed state (Yes in S2), the control portion 5 shifts the process to step S3. In addition, if the ADF 1 has not been switched from the open state to the closed state (No in S2), the control portion 5 waits in step S2 for switching of the ADF 1 from the open state to the closed state.

<Step S3>

In step S3, the control portion 5 starts reading of image data by the image reading portion 2. Specifically, the control portion 5 causes the image reading portion 2 to start the image reading process of reading image data of the document placed on the document placement surface 211. Accordingly, the image data of the document placed on the document placement surface 211 is read by the image reading portion 2. Here, the process in step S3 is an example of a first step in the present disclosure, and is performed by the reading control portion 52 of the control portion 5. When a user operation of a start key provided in the operation display portion 6 is performed, the control portion 5 may cause the image reading portion 2 to start the image reading process for the image data of the document placed on the document placement surface 211.

It is conceivable that, when enablement/disenablement of the image combination function is set in the image reading process, the first document has been already placed on the document placement surface 211 and the ADF 1 has been closed. Thus, the control portion 5 may start the image reading process for the first document in accordance with a user operation of the start key, and may start the image reading process for each of the second document and subsequent documents when the ADF 1 is switched from the open state to the closed state. Accordingly, the user is allowed to perform an operation for setting a reading condition such as enablement/disenablement of the image combination function in a state where the first document has been placed on the document placement surface 211 and the ADF 1 has been closed, and it is possible to omit an operation for starting the image reading process for each of the second document and subsequent documents.

<Step S4>

In step S4, the control portion 5 corrects tilt of the image data read in step S3. For example, the control portion 5 detects the boundary lines between the document placement surface 211 and the document on the basis of the density of each pixel included in the image data. Then, the control portion 5 corrects tilt of images of the document included in the image data such that tilt of each detected boundary lines in the image data is parallel to the main-scanning direction 214 or the sub-scanning direction 215 in the image data. Here, the process in step S4 is performed by the correction processing portion 53 of the control portion 5.

<Step S5>

In step S5, the control portion 5 detects a corner portion of the document on the basis of the image data read in step S3. Specifically, the control portion 5 detects the corner portion formed by the boundary line detected in step S4, as a corner portion of the document. Here, the process in step S5 is an example of a second step in the present disclosure, and is performed by the detection processing portion 54 of the control portion 5.

<Step S6>

In step S6, the control portion 5 determines whether the total number of the corner portions of the document detected in step S5 is equal to or greater than the set value. For example, the set value is four.

Here, if the control portion 5 determines that the total number of the corner portions of the document detected in step S5 is equal to or greater than the set value (Yes in S6), the control portion 5 shifts the process to step S7. In addition, if the total number of the corner portions of the document detected in step S5 is less than the set value (No in S6), the control portion 5 shifts the process to step S2, and waits for the total number of the corner portions of the document becoming equal to or greater than the set value.

If the total number of the corner portions of the document detected in step S5 exceeds the set value, the control portion 5 may display, on the operation display portion 6, a message indicating that an error has occurred, and may end the image combination process. In addition, if the image reading process is performed a preset upper limit number of times while the total number of the corner portions of the document is less than the set value, the control portion 5 may display, on the operation display portion 6, a message indicating that an error has occurred, and may end the image combination process.

<Step S7>

In step S7, the control portion 5 determines the size of the document in accordance with the number of the image data read in step S3 until the total number of the corner portions of the document detected in step S5 becomes equal to or greater than the set value. Here, the process in step S7 is performed by the size determination portion 55 of the control portion 5.

For example, if the number of the image data read in step S3 is two, the control portion 5 determines that the size of the document is A2 portrait. In addition, if the number of the image data read in step S3 is four, the control portion 5 determines that the size of the document is A1 landscape.

In the case where the set value is set to a value other than four, the process in step S7 may be omitted.

<Step S8>

In step S8, the control portion 5 combines a plurality of the respective image data read in step S3 until the total number of the corner portions of the document detected in step S5 becomes equal to or greater than the set value. Here, the process in step S8 is an example of a third step in the present disclosure, and is performed by the combination processing portion 56 of the control portion 5.

For example, the control portion 5 combines the plurality of the respective image data on the basis of the size of the document determined in step S7 and the positions of the corner portions of the document included in the respective image data detected in step S5. Accordingly, it is possible to combine the plurality of the respective image data through a simple process.

Specifically, the control portion 5 combines the respective image data by superposing images of the document included in the plurality of the respective image data so as to match the size determined in step S7, on the basis of the positions of the corner portions of the document included in the plurality of the respective image data. In addition, the control portion 5 performs a rotation process of rotating the image data by 180 degrees as necessary, and combines the respective image data. For example, the control portion 5 determines presence/absence of execution of the rotation process for each of the plurality of the image data, on the basis of the order of reading of the plurality of the respective image data.

The control portion 5 may combine the respective image data on the basis of an overlap region of the images detected from the plurality of the respective image data read in step S3. In addition, in this case, the process in step S7 may be omitted. Accordingly, even if an image of a document having an undefined size is read in the image combination process, it is possible to combine a plurality of respective read image data.

When the control portion 5 combines the respective image data on the basis of the overlap region of the images detected from the plurality of the respective image data read in step S3, if the image data that is not included in the overlap region of the images is present, the control portion 5 may issue a notification indicating that it is impossible to combine the respective image data. For example, the control portion 5 issues a notification by displaying, on the operation display portion 6, a message indicating that it is impossible to combine the respective image data.

<Step S9>

In step S9, the control portion 5 outputs combined image data resulting from the combination in step S8. For example, the control portion 5 outputs the combined image data by causing the image forming portion 3 to perform printing. In addition, the control portion 5 may output the combined image data by storing the combined image data into the storage portion 7.

Here, process flow of the image combination process will be specifically described with reference to FIGS. 5 to 9. FIGS. 5 to 8 are diagrams showing a plurality of image data D1 to D4 read from a document P that has a size of A1 landscape and is placed on the document placement surface 211. FIG. 9 is a diagram showing a state where the plurality of image data D1 to D4 are combined.

Figure 5:
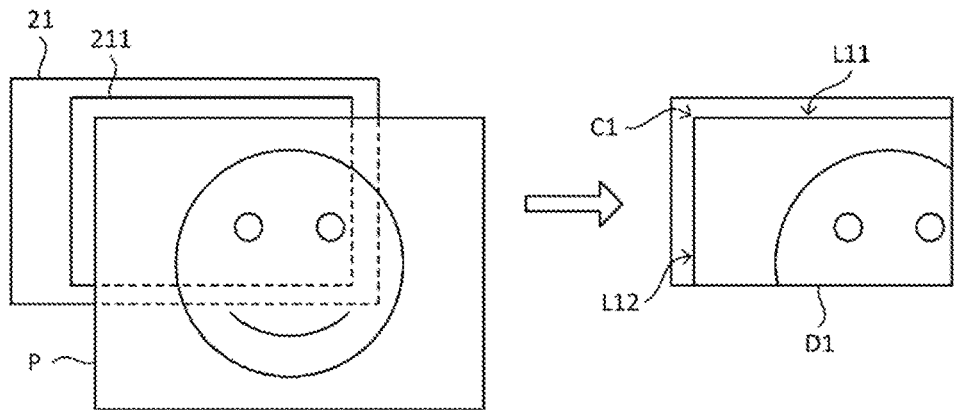
FIG. 5 is a diagram showing an example of a document read by the image forming apparatus according to the embodiment of the present disclosure.

First, after the image combination process is instructed, the user performs an operation of placing the document P on the document placement surface 211 in an attitude shown in FIG. 5 and closing the ADF 1. When the control portion 5 detects switching of the ADF 1 from the open state to the closed state, the control portion 5 performs the image reading process to obtain the image data D1 (step S3 for the first time). Subsequently, on the basis of the obtained image data D1, the control portion 5 detects a boundary line L11 and a boundary line L12 and corrects tilt of an image of the document P included in the image data D1 (step S4). Then, the control portion 5 detects a corner portion C1 formed by the detected boundary line L11 and boundary line L12, as a corner portion of the document P (step S5).

Figure 6:
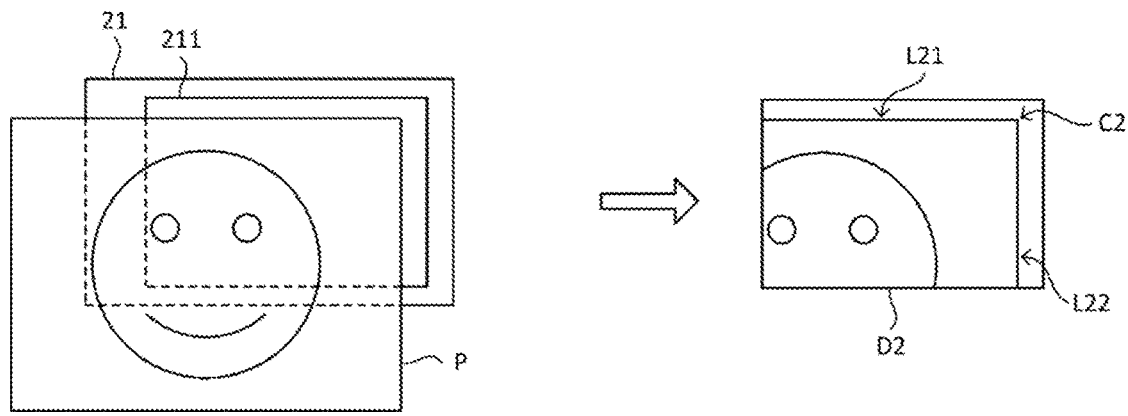
FIG. 6 is a diagram showing the example of the document read by the image forming apparatus according to the embodiment of the present disclosure.

Next, the user performs an operation of placing the document P on the document placement surface 211 in an attitude shown in FIG. 6 and closing the ADF 1. When the control portion 5 detects switching of the ADF 1 from the open state to the closed state, the control portion 5 performs the image reading process to obtain the image data D2 (step S3 for the second time). Subsequently, on the basis of the obtained image data D2, the control portion 5 detects a boundary line L21 and a boundary line L22 and corrects tilt of an image of the document P included in the image data D2 (step S4). Then, the control portion 5 detects a corner portion C2 formed by the detected boundary line L21 and boundary line L22, as a corner portion of the document P (step S5).

Figure 7:
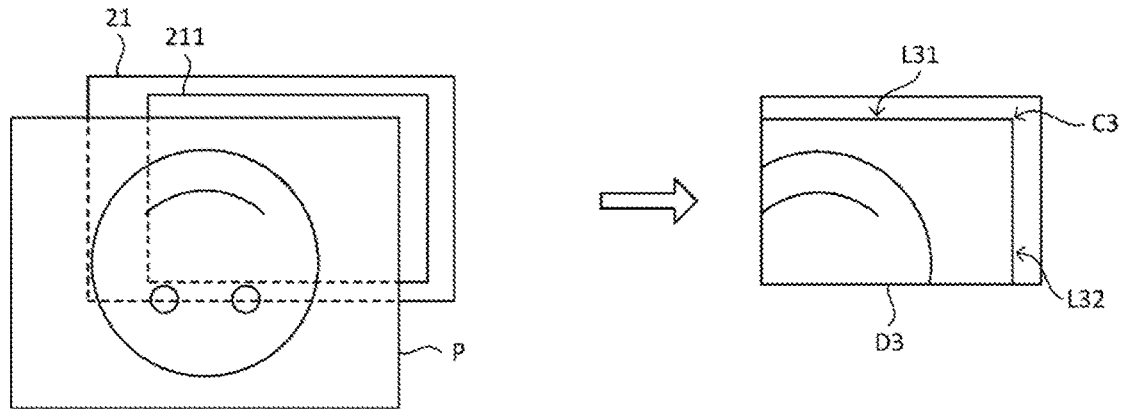
FIG. 7 is a diagram showing the example of the document read by the image forming apparatus according to the embodiment of the present disclosure.

Next, the user performs an operation of placing the document P on the document placement surface 211 in an attitude shown in FIG. 7 and closing the ADF 1. When the control portion 5 detects switching of the ADF 1 from the open state to the closed state, the control portion 5 performs the image reading process to obtain the image data D3 (step S3 for the third time). Subsequently, on the basis of the obtained image data D3, the control portion 5 detects a boundary line L31 and a boundary line L32 and corrects tilt of an image of the document P included in the image data D3 (step S4). Then, the control portion 5 detects a corner portion C3 formed by the detected boundary line L31 and boundary line L32, as a corner portion of the document P (step S5).

Figure 8:
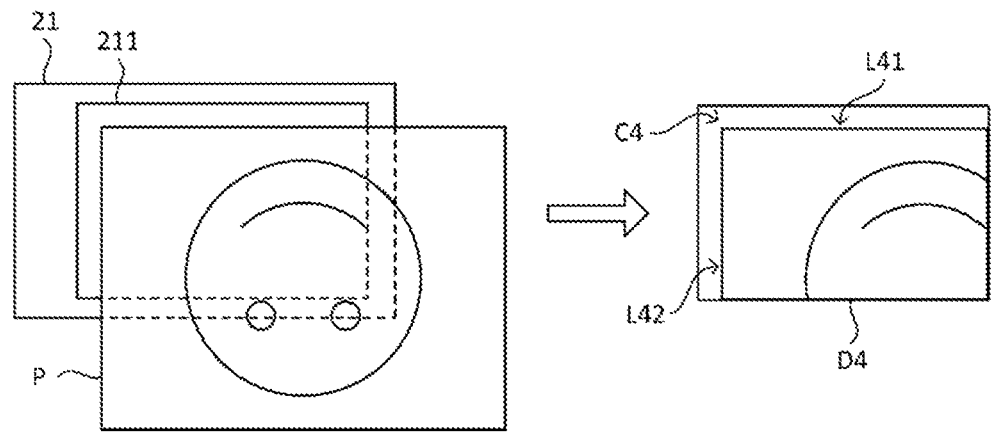
FIG. 8 is a diagram showing the example of the document read by the image forming apparatus according to the embodiment of the present disclosure.
Figure 9:
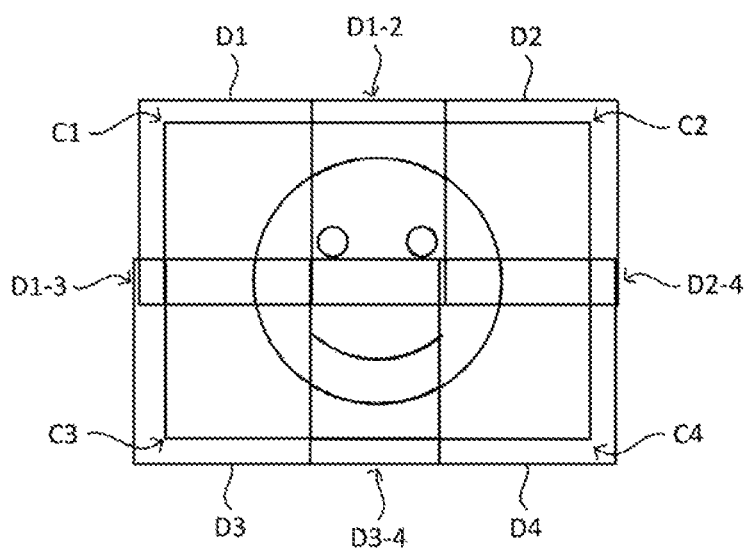
FIG. 9 is a diagram showing an example of a plurality of image data combined by the image forming apparatus according to the embodiment of the present disclosure.

Next, the user performs an operation of placing the document P on the document placement surface 211 in an attitude shown in FIG. 8 and closing the ADF 1. When the control portion 5 detects switching of the ADF 1 from the open state to the closed state, the control portion 5 performs the image reading process to obtain the image data D4 (step S3 for the fourth time). Subsequently, on the basis of the obtained image data D4, the control portion 5 detects a boundary line L41 and a boundary line L42 and corrects tilt of an image of the document P included in the image data D4 (step S4). Then, the control portion 5 detects a corner portion C4 formed by the detected boundary line L41 and boundary line L42, as a corner portion of the document P (step S5).

When the corner portions of the document P the number of which is equal to or greater than four, which is the set value, is detected, the control portion 5 determines that the size of the document P is A1 landscape, on the basis of the number of the obtained image data D1 to D4 (step S7). Then, as shown in FIG. 9, the control portion 5 combines the respective image data D1 to D4 by superposing the images of the document P included in the respective image data D1 to D4 so as to match the A1 landscape size determined in step S7, on the basis of the positions of the corner portions C1 to C4 of the document P included in the respective obtained image data D1 to D4. The control portion 5 performs a size cutting process of cutting document-outside regions included in the image data that have been combined, on the basis of the positions of the corner portions C1 to C4 of the document P, to obtain the combined image data.

Here, when combining the respective image data D1 to D4, the control portion 5 performs the rotation process on the image data D3 and the image data D4. For example, if the image data D1 to D4 of the respective sections of the document P are read in the order shown in FIGS. 5 to 8, the control portion 5 performs the rotation process on the image data D3 obtained in the image reading process for the third time and the image data D4 obtained in the image reading process for the fourth time. In this case, the control portion 5 may give an instruction of the reading order for the document P to the user in step S1.

As shown in FIG. 9, the control portion 5 may specify image data required for the rotation process, on the basis of coincidence rates of the image data in an overlap region D1-2, an overlap region D1-3, an overlap region D3-4, and an overlap region D2-4 included in the respective image data D1 to D4 that have been combined.

As described above, in the image combination process, on the basis of the image data read from the document, the corner portions of the document are detected, and the plurality of the respective image data read until the total number of the detected corner portions of the document becomes the set value are combined. Accordingly, when image data of a document having a size exceeding the size of the document placement surface 211 is read, it is possible to reduce time and effort for an operation for setting the size of the document to be read or a number of times of reading.

In the image combination process, when switching of the ADF 1 from the open state to the closed state is detected, image data of a document placed on the document placement surface 211 is read. Accordingly, when image data of a document having a size exceeding the size of the document placement surface 211 is read, it is possible to reduce time and effort for an operation for performing the image reading process that is to be performed a plurality of times.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
    an image reading portion configured to read respective image data of a document placed on a document placement surface a plurality of times;
    a detection processing portion configured to detect corner portions of the document on the basis of the image data read by the image reading portion; and
    a combination processing portion configured to combine the respective image data read by the image reading portion until a total number of the corner portions of the document detected by the detection processing portion becomes a predetermined value,
    wherein the image reading device is configured to output combined image data of an entirety of the document.

2. The image reading device according to claim 1, wherein the detection processing portion detects a corner portion formed by boundary lines between the document placement surface and the document included in the image data, as a corner portion of the document.

3. The image reading device according to claim 1, further comprising:
    a cover member provided so as to be able to open/close relative to the document placement surface;
    an open/close detection portion configured to detect an open/closed state of the cover member; and
    a reading control portion configured to start reading of the image data by the image reading portion when the open/close detection portion detects switching of the cover member from an open state to a closed state.

4. The image reading device according to claim 1, further comprising a size determination portion configured to determine a size of the document in accordance with a number of the image data read by the image reading portion until the total number of the corner portions of the document detected by the detection processing portion becomes four, wherein
    the combination processing portion combines the respective image data on the basis of the size of the document determined by the size determination portion and positions of the corner portions included in the respective image data.

5. The image reading device according to claim 1, wherein the combination processing portion combines the respective image data on the basis of an overlap region of images detected from the respective image data read by the image reading portion.

6. The image reading device according to claim 5, wherein, if the image data that does not include the overlap region of the images is present, the combination processing portion issues a notification indicating that it is impossible to combine the respective image data.

7. The image reading device according to claim 1, further comprising a correction processing portion configured to correct tilt of the respective image data read by the image reading portion, wherein
    the combination processing portion combines the respective image data on which the correction process by the correction processing portion has been performed.

8. An image forming apparatus comprising:
    the image reading device according to claim 1; and
    an image forming portion capable of forming an image on the basis of image data.

9. The image reading device according to claim 1, wherein the image reading device is configured output the combined image data to an image forming portion to be printed or to a storage portion to be stored.

10. An image reading method comprising:
    a first step of reading respective image data of a document placed on a document placement surface a plurality of times;
    a second step of detecting corner portions of the document on the basis of the read image data;
    a third step of combining the respective image data read in the first step until a total number of the detected corner portions of the document becomes a predetermined value; and
    a fourth step of outputting combined image data of an entirety of the document.

* * * * *